US005084339A

United States Patent [19]

Tachibana et al.

[11] Patent Number: 5,084,339

[45] Date of Patent: Jan. 28, 1992

[54] PLASTIC FILM WITH TRANSPARENT SUPPORT AND ANTISTATIC LAYER

[75] Inventors: Noriki Tachibana; Yoichi Saito; Toshiaki Yamazaki, all of Hino, Japan

[73] Assignee: Konica Corporation, Tokyo, Japan

[21] Appl. No.: 521,591

[22] Filed: May 10, 1990

[30] Foreign Application Priority Data

May 16, 1989 [JP] Japan .................................. 1-122564

[51] Int. Cl.$^5$ ......................... B32B 5/16; B32B 27/36; G03C 1/82

[52] U.S. Cl. .................................... 428/327; 428/340; 428/483; 428/522; 428/414; 428/922; 430/124; 430/126; 430/496

[58] Field of Search ............... 428/327, 340, 483, 522, 428/922, 414

[56] References Cited

U.S. PATENT DOCUMENTS 4,415,626 11/1983 Hasenauer et al. ................ 428/515

FOREIGN PATENT DOCUMENTS 245090 11/1987 European Pat. Off. .
2444958 7/1980 France .
2024440 1/1980 United Kingdom .

*Primary Examiner*—P. C. Sluby
*Attorney, Agent, or Firm*—Jordan B. Bierman

[57] ABSTRACT

Disclosed is a plastic film comprising a support and an antistatic layer, provided thereon, comprising a reaction product of a water-soluble electroconductive polymer, hydrophobic polymer particles and a curing agent, characterized in that the hydrophobic polymer has a polyalkylene oxide chain.

10 Claims, No Drawings

PLASTIC FILM WITH TRANSPARENT SUPPORT AND ANTISTATIC LAYER

BACKGROUND OF THE INVENTION

This invention relates to an antistatic layer for plastic film, particularly to a light-sensitive silver halide photographic material excellent in antistatic ability.

Generally speaking, plastic films have strong chargeability, which gives many restrictions in uses in many examples. For example, in light-sensitive silver halide photographic materials, supports such as polyethylene terephthalate have been generally used, which are liable to be charged particularly at lower temperatures during winter season. In recent days, when high sensitivity photographic emulsions are coated at high speed, or light-sensitive materials of high sensitivity are subjected to exposure treatment through an automatic printer, antistatic countermeasures are particularly important.

When a light-sensitive material is charged, static marks may appear by its discharging, or a foreign matter such as dust, etc. may be attached, whereby pinholes may be generated to deteriorate markedly quality and workability is lowered extremely for correction thereof. For this reason, anti-static agents have been generally used in light-sensitive materials, and recently, fluorine-containing surfactants, cationic surfactants, amphoteric surfactants, surfactants or polymeric compounds containing polyethylene oxide groups, polymers containing sulfonic acid or phosphoric acid groups in the molecule, etc. have been employed.

Particularly, chargeability control with a fluorine-containing surfactant or electroconductivity improvement with an electroconductive polymer has been frequently used and, for example, in Japanese Unexamined Patent Publications Nos. 91165/1974 and 121523/1974, an example of applying an ion type polymer having dissociable group in the polymer main chain is disclosed.

However, in these prior art, the antistatic ability will be deteriorated to a great extent by developing processing. This may be considered to be due to the fact that the antistatic ability is low via the steps such as the developing step using an alkali, the acidic fixing step, the step of washing with water, etc. Therefore, in the case when printing is conducted by further use of a treated film as in printing light-sensitive material, etc., the problems such as pinhole generation, etc. by attachment of dust, etc. will ensue. For this reason, for example, Japanese Unexamined Patent Publications Nos. 84658/1980 and 174542/1986 propose an antistatic layer comprising a water-soluble electroconductive polymer having carboxyl group, a hydrophobic polymer having carboxyl group and a polyfunctional aziridine. According to this method, antistatic ability can remain after the treatment, but since transparency of the coated film depends greatly on the drying speed, there was involved the drawback that transparency was lowered to a level which could not stand use at all when drying was effected quickly for improvement of production efficiency, even though it might be transparent when drying was effected slowly.

SUMMARY OF THE INVENTION

To cope with the problems as described above, an object of the present invention is to provide an antistatic layer for plastic films excellent in transparency without haze even when dried quickly, and also without deterioration of antistatic ability after processing such as developing processing, etc.

The above object of the present invention can be accomplished by an antistatic layer, comprising a plastic film having an antistatic layer comprising a reaction product of a water-soluble electroconductive polymer, hydrophobic polymer particles and a curing agent, characterized in that said hydrophobic polymer has a polyalkylene oxide chain.

DETAILED DESCRIPTION OF THE INVENTION

The water-soluble electroconductive polymer of the present invention may include polymers having at least one electroconductive group selected from sulfonic acid groups, sulfuric acid ester groups, quaternary ammonium salts, tertiary ammonium salts and carboxyl group. The electroconductive groups is required to be 5% by weight or more per one molecule of the polymer. In the water-soluble electroconductive polymer, at least one of hydroxy group, amino group, epoxy group, aziridine group, active methylene group, sulfinic acid group, aldehyde group and vinylsulfone group should be preferably contained. These groups should be preferably 5% by weight or more per one molecule of the polymer. The polymer may have a molecular weight of 3,000 to 100,000, preferably 3,500 to 50,000.

In the following, exemplary compounds of the water-soluble electroconductive polymers to be used in the present invention are set forth, but the present invention is not limited by these examples at all.

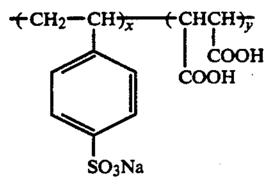

x:y = 60:40
$\overline{M}n = 5000$ (1)

Homopolymer

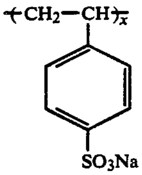

$\overline{M}n = 5000$ (2)

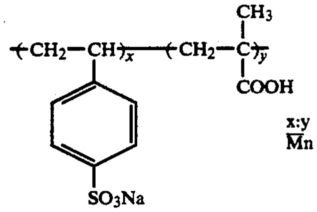

x:y = 98.5:1.5
$\overline{M}n \approx 5000$ (3)

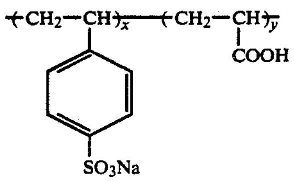

x:y = 50:50
$\overline{M}n \approx 12000$ (4)

-continued (5)

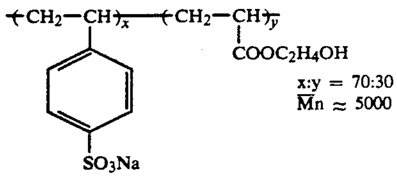

x:y = 70:30
$\overline{M}n \approx 5000$ (6)

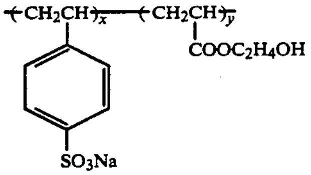

x:y = 90:10
$\overline{M}n = 10000$ (7)

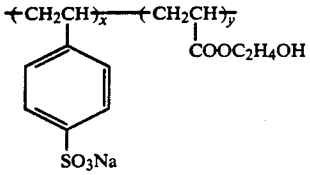

x:y = 60:40
$\overline{M}n = 7000$ (8)

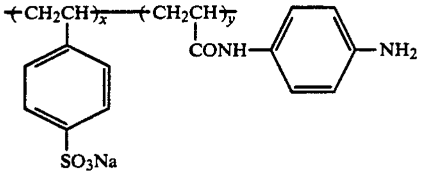

x:y = 90:10
$\overline{M}n = 15000$ (9)

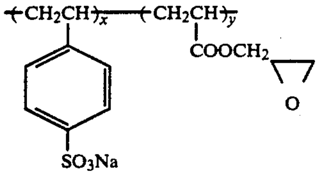

x:y = 60:40
$\overline{M}n = 5000$ (10)

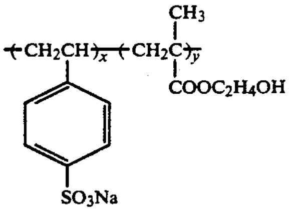

x:y = 90:10
$\overline{M}n = 20000$ (11)

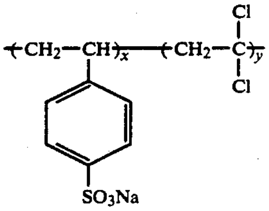

x:y = 97:3
$\overline{M}n \approx 30000$ (12)

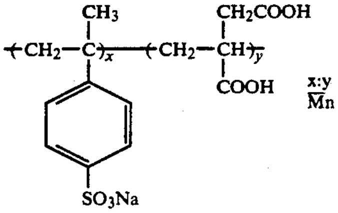

x:y = 98:2
$\overline{M}n \approx 5000$

-continued (13)

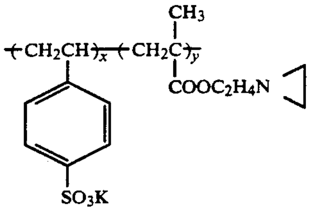

x:y = 60:40
$\overline{M}n = 8000$ (14)

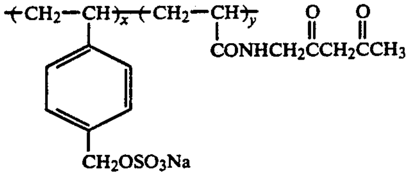

x:y = 95:5
$\overline{M}n \approx 25000$ (15)

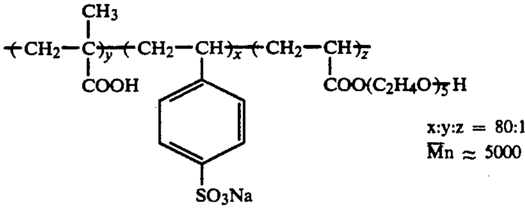

x:y:z = 80:19:1
$\overline{M}n \approx 5000$ (16)

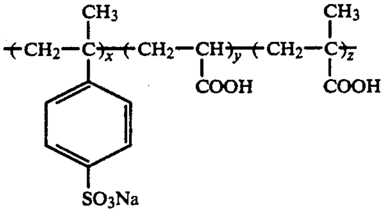

x:y:z = 70:28:2
$\overline{M}n \approx 6000$ (17)

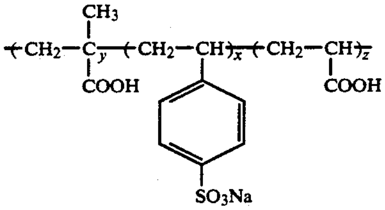

x:y:z = 85:13:2
$\overline{M}n \approx 8000$ (18)

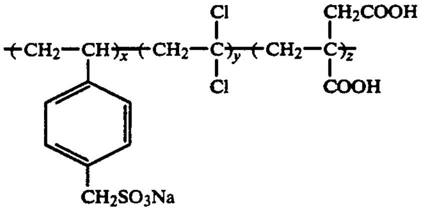

x:y:z = 80:16:4
$\overline{M}n \approx 10000$ (19)

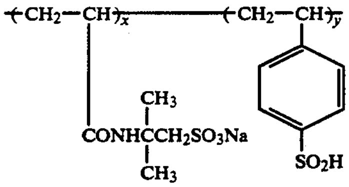

x:y = 90:10
$\overline{M}n \approx 30000$ (20)

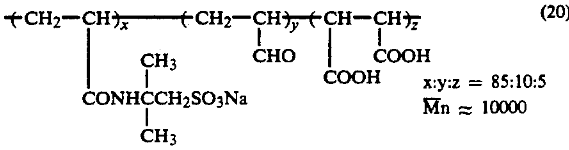

x:y:z = 85:10:5
$\overline{M}n \approx 10000$

-continued (21)

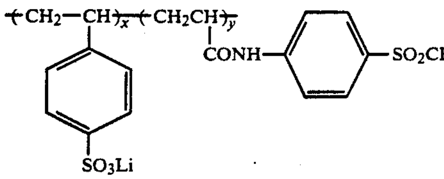

x:y = 90:10
$\overline{Mn} \approx 6000$ (22)

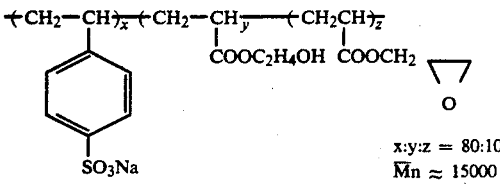

x:y:z = 80:10:10
$\overline{Mn} \approx 15000$

Dextran sulfite (23)
substitution degree : 2.0, $\overline{Mn}$ = 100,000

(24)

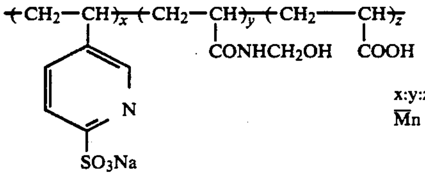

x:y:z = 55:35:10
$\overline{Mn} \approx 30000$ (25)

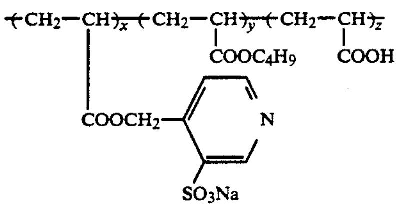

x:y:z = 50:10:40
$\overline{Mn} \approx 60000$ (26)

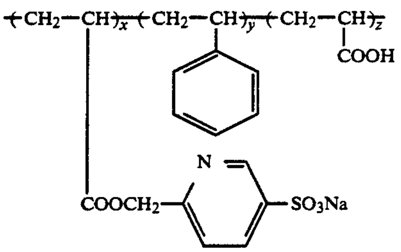

x:y:z ≈ 60:10:30
$\overline{Mn} \approx 60000$

In the above formulae (1) to (26), x, y and z each represent mole % of the monomeric component, $\overline{Mn}$ an average molecular weight (in the present specification, average molecular weight refers to number average molecular weight), which is a measured value according to GPC represented by polyethylene glycol.

These polymers are commercially available or can be synthesized by polymerization of monomers obtained in conventional manner. The amount of these compounds added should be preferably 0.01 to 10 g/$m^2$, particularly preferably 0.1 to 5 g/$m^2$.

These compounds can be used alone or as mixtures with various hydrophilic binders or hydrophobic binders to form layers. Those which can be used particularly advantageously as the hydrophilic binder are gelatin or polyacrylamide, but as other examples, colloidal albumin, cellulose acetate, cellulose nitrate, polyvinyl alcohol, hydrolyzed polyvinyl acetate and phthalated gelatin may be included. As the hydrophobic binder, polymers with molecular weights of 20,000 to 1,000,000 are included, as exemplified by styrene-butyl acrylate-acrylic acid ternary copolymer, butyl acrylate-acrylonitrile-acrylic acid ternary copolymer and methyl methacrylate-ethyl acrylate-acrylic acid ternary copolymer.

Next, as the hydrophobic polymer particles to be contained in the antistatic layer containing the water-soluble electroconductive polymer of the present invention, the hydrophobic polymers contained in the so-called latex form substantially insoluble in water. The hydrophobic polymer can be obtained by polymerization of monomers according to any desired combination from among styrene, styrene derivatives, alkyl acrylates, alkyl methacrylates, olefin derivatives, halogenated ethylene derivatives, acrylamide derivatives, methacrylamide derivatives, vinyl ester derivatives, acrylonitrile, etc. Particularly, styrene derivatives, alkyl acrylates and alkyl methacrylates should be preferably contained in amounts of at least 30 mole %, particularly 50 mole % or more. The particle size of the hydrophobic polymer is preferably in the range of 0.02 to 0.4μ, more preferably 0.05 to 0.2μ.

As the method for introducing polyalkylene oxide chain into the hydrophobic polymer of the present invention, it is preferable to use the method comprising copolymerization with a monomer having polyalkylene oxide chain.

As the monomer having the polyalkylene oxide chain, those represented by the following formula (M) are preferred.

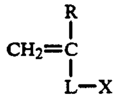

Formula (M)

wherein R represents hydrogen atom, a halogen atom, a lower alkyl group having 1 to 4 carbon atoms or $-CH_2-L-X$; L represents a group having -COO- or

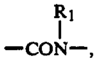

or an optionally substituted aryl group having 6 to 12 carbon atoms; $R^1$ represents hydrogen atom, an optionally substituted aryl group or a lower alkyl group having 1 to 4 carbon atoms; X represents $-(R_2-O)_{\overline{n}}R_3$; $R_2$ comprising at least one selected from $-CH_2CH_2-$,

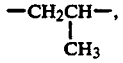

$-CH_2CH_2CH_2-$,

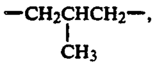

$-CH_2CH_2CH_2CH_2-$ and

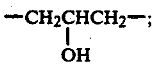

$R_3$ represents hydrogen atom or a lower alkyl group having 1 to 4 carbon atoms, and n is an integer of not less than 2 and not more than 70.

The ratio of introducing the monomers of the formula (M) is preferably in the range of 0.1 to 20 mole %, more preferably 1 to 10 mole % to all monomers forming a latex. In the following, specific examples of these monomers are enumerated:
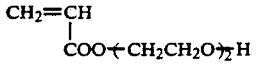
M-1
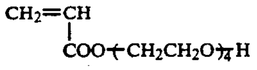
M-2
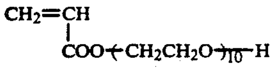
M-3
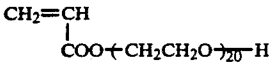
M-4
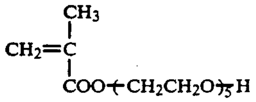
M-5
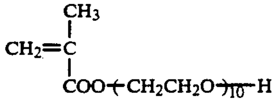
M-6
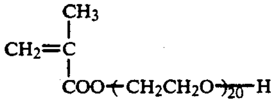
M-7
M-8
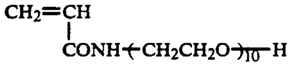
M-9
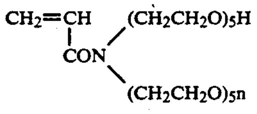
M-10
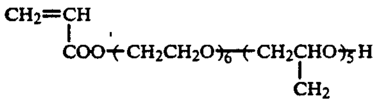
M-11
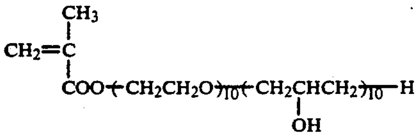
M-12
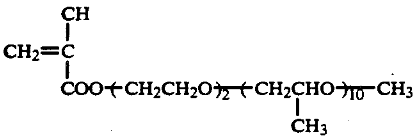
M-13
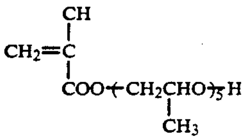
M-14
-continued
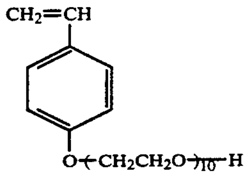
M-15
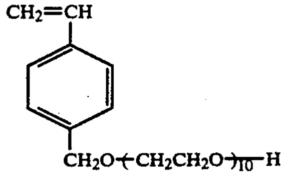
M-16
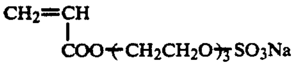
M-17
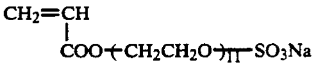
M-18
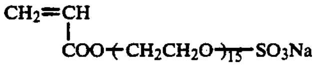
M-19
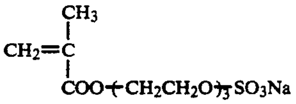
M-20
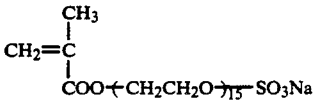
M-21
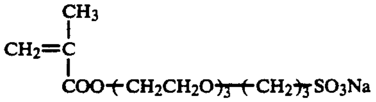
M-22
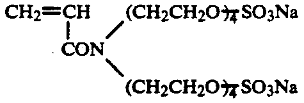
M-23
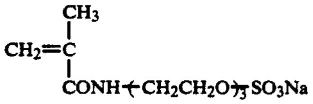
M-24
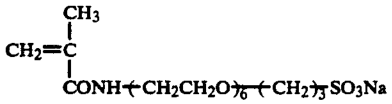
M-25
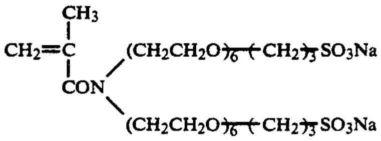
M-26

-continued

M-27

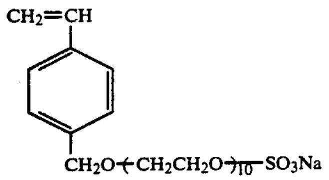

M-28

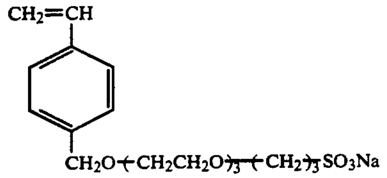

M-29

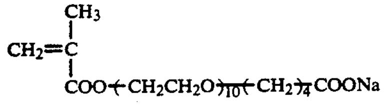

For making the hydrophobic polymer into the form of a latex, there are the two methods of performing emulsion polymerization and dissolving the polymer in solid state into a low boiling solvent to be finely dispersed therein followed by evaporation of the solvent, but emulsion polymerization is preferable in the points of fine particle size, and yet with regular sizes.

As the surfactant to be used during emulsion polymerization, anionic and nonionic surfactants may be preferably used, preferably in an amount of 10% by weight or less based on the monomer. A large amount of surfactant may cause clouding of the antistatic layer.

The molecular weight of the hydrophobic polymer may be 3,000 or higher, and there is no substantial difference depending on the molecular weight.

Specific examples of the hydrophobic polymer are shown below.

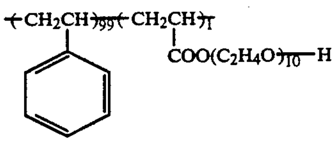

1.

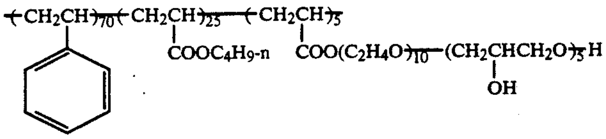

2.

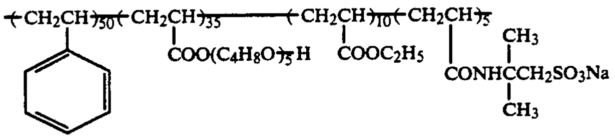

3.

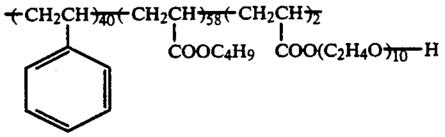

4.

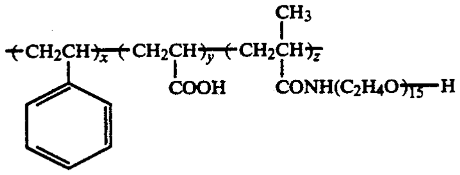

x:y:z = 80:10:10

5.

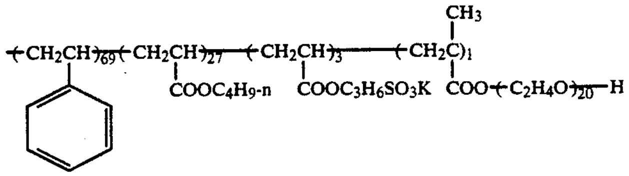

6.

-continued

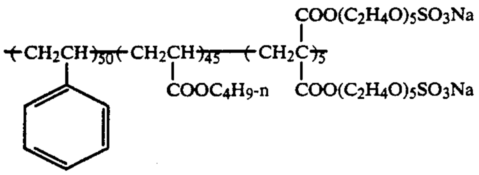

7.

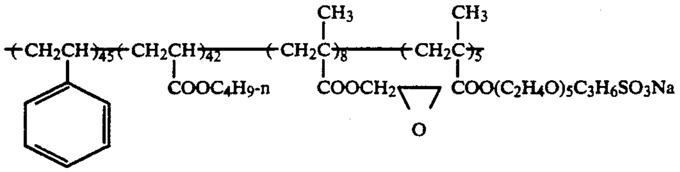

8.

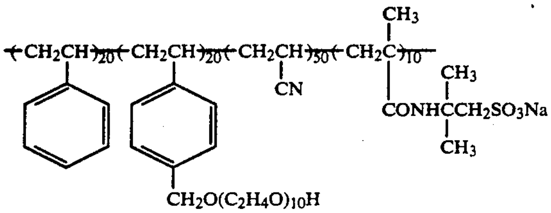

9.

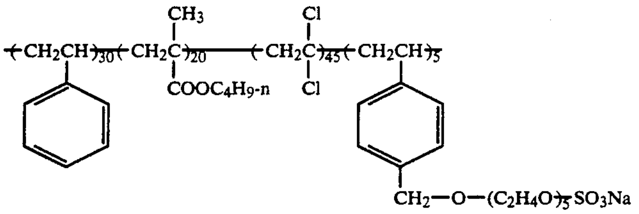

10.

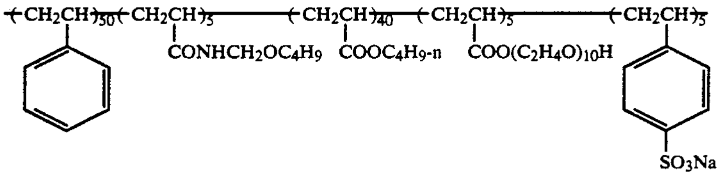

11.

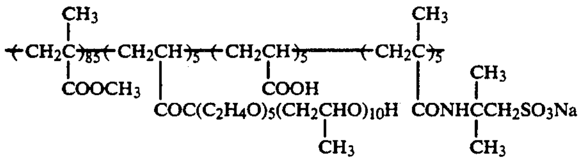

12.

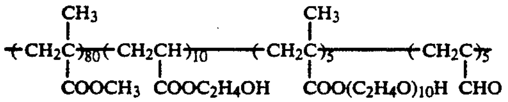

13.

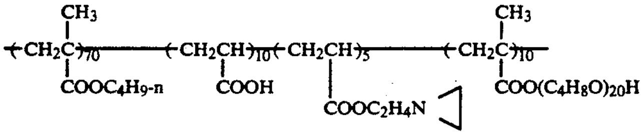

14.

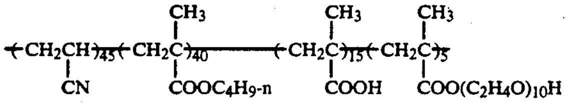

15.

In the present invention, an antistatic layer is formed on a transparent support by coating. As the transparent support, all supports for photography can be used, but preferably polyethylene terephthalate or cellulose triacetate prepared so as to transmit 90% or more of visible light.

These transparent supports can be prepared by the methods well known to those skilled in the art, but in some cases, a dye may be slightly added to give slight blue tint substantially without interfering with light transmission.

The support of the present invention may also have a subbing layer containing a latex polymer provided by coating 5 after corona discharging treatment. The corona discharging treatment may be applied particularly preferably at 1 mW to 1 $KW/m^2$·min as the energy value. Also, particularly preferably, corona discharging treatment should be effected again before coating of the antistatic layer after coating of the latex subbing layer. The drying temperature may be 60° C. or higher, preferably 90° C. or higher.

As the curing agent for the antistatic layer of the present invention, a polyfunctional aziridine type compound is preferable. Particularly, a difunctional or trifunctional aziridine having a molecular weight of 600 or less is preferable. The curing agent is incorporated into electroconductive conductive polymer in an amount of 1 to 60 mole %, preferably 5 to 40 mole %.

Drying should be preferably performed by drying according to parallel stream drying, vertical stream drying, etc., and further in combination with IR-drying, microwave drying, etc., but it is preferable to perform drying under the conditions of an overall heat transfer coefficient of 20 $Kcal/m^2$·hr·°C. or higher in production efficiency.

The antistatic layer of the present invention may be on the support side relative to the photosensitive layer, or on the opposite side of the support relative to the photo-sensitive layer, namely the back surface.

The present invention can be applied to substantially all light-sensitive materials formed on supports. For example, they are light-sensitive silver halide color materials, light-sensitive materials for roentgenogram, light-sensitive materials for printing plates, etc.

For the silver halide emulsion to be used in the light-sensitive material of the present invention, as the silver halide, any of those used for conventional silver halide emulsions such as silver bromide, silver chloride, silver iodobromide, silver chlorobromide, silver chloroiodobromide, etc. can be used, and the silver halide grains may be obtained according to any of the acidic method, the neutral method and the ammonia method.

The silver halide emulsion grains may be either those having a uniform silver halide composition distribution within the particles or core/shell grains with different silver halide compositions between the inner portion and the surface layer of the grains, and also may be the grains with the latent images being formed primarily on the surface or primarily internally of the grain.

The silver halide emulsion to be used in the present invention can be stabilized by use of the compounds as disclosed in U.S. Pat. Nos. 2,444,607, 2,716,062 and 3,512,982, West Germany Patent Publications Nos. 1,189,380, 2,058,626, 2,118,411, Japanese Patent Publication No. 4133/1968, U.S. Pat. No. 3,342,596, Japanese Patent Publication No. 4417/1972, West Germany Patent Publication No. 2,149,789, Japanese Patent Publications Nos. 2825/1964 and 13566/1974, etc., preferably, for example, 5,6-trimethylene- 7-hydroxy-S-triazolo(1,5-a)-pyrimidine, 5,6-tetramethylene-7-hydroxy-S-triazolo(1,5-a)-pyrimidine, 5-methyl-7-hydroxy-S-triazolo(1,5-a)-pyrimidine, 5-methyl-7-hydroxy-S-triazolo(1,5-a)-pyrimidine, 7-hydroxy-S-triazolone(1,5-a)pyrimidine, 5-methyl-6-bromo-7-hydroxy-S-triazolo(1,5-a)pyrimidine, gallic acid esters (e.g. isoamyl gallate, dodecyl gallate, propyl gallate and sodium gallate), mercaptans (1-phenyl-5-mercaptotetrazole and 2-mercaptobenzthiazole), benzotriazoles (5-bromobenztriazole, 5-methyl-benztriazole), benzimidazoles (6-nitrobenzimidazole), etc.

In the light-sensitive silver halide photographic material according to the present invention and/or the developer, an amino compound can be contained.

For enhancing developability, a developing agent such as phenidone or hydroquinone, an inhibitor such as benzotriazole can be contained on the emulsion side. Alternatively, for enhancing the processing ability, a developing agent or an inhibitor can be contained in the backing layer.

The hydrophilic colloid to be used advantageously in the present invention is gelatin.

The gelatin to be used in the present invention may include both of alkali treated and acidic treated gelatins.

As the developing agent to be used for developing of the light-sensitive silver halide photographic material of the present invention, there may be effectively used the developers as described in T.H. James, "The Theory of the Photographic Process", Fourth Edition, pp. 291-334 and Journal of the American Chemical Society, Vol. 73, pp. 3,100 (1951). These developers can be used either singly or in combination of two or more kinds, but preferably in combination of two or more kinds. Also, in the developer to be used for developing of the light-sensitive material according to the present invention, for example, sulfites such as sodium sulfite, potassium sulfite, etc. can be used as the preservative without impairing the effect of the present invention. Also, as the preservative and hydroxylamine, hydrazide compounds can be used, and in this case, the amount of such compound used may be preferably 5 to 500 g, more preferably 20 to 200 g per liter of the developer.

Also, in the developer, glycols may be contained, and examples of such glycols may include ethylene glycol, diethylene glycol, propylene glycol, triethylene glycol, 1,4-butanediol, 1,5-pentene diol, etc., but diethylene glycol may be preferably used. The amount of these glycols used may be preferably 5 to 500 g, more preferably 20 to 200 g per liter of the developer. These organic solvents can be used either alone or in combination.

The light-sensitive silver halide photographic material can give a light-sensitive material extremely excellent in storage stability by performing developing processing by use of a developer containing a developing inhibitor as described above.

The pH value of the developer comprising the above composition may be preferably 9 to 13, but the pH value may be more preferably 10 to 12 in preservability and photographic characteristics. As for the cations in the developer, a developer with higher potassium ion ratio than sodium ion is preferable for enhancing the activity of the developer.

The light-sensitive silver halide photographic material according to the present invention can be processed according to various conditions. The processing temperature may be a developing temperature of 50° C. or lower, particularly around 25° C. to 40° C., and the developing should be generally accomplished within 2 minutes, particularly preferably from 10 seconds to 50 seconds to bring about preferable effects in many cases. Also, other processing steps than developing, for example, water washing, stopping, stability and fixing, further, if necessary, pre-film hardening, neutralization, etc. can be employed as desired, and these can be also omitted suitably. Further, these treatments may be also the so-called manual developing processing such as dish developing, frame developing, etc., or mechanical developing such as roller developing, hanger developing, etc.

The present invention is described in detail by referring to examples. As a matter of course, the present invention is not limited by the examples as described below at all.

EXAMPLE 1

A polyethylene terephthalate applied with subbing treatment was coated with an antistatic solution having the constitution shown below by use of a roll fit coating pan and an air knife at a speed of 33 m/min. to 10 ml/$dm^2$.

Water-soluble electroconductive polymer (A): 10 g/l
Hydrophobic polymer (B): 4 g/l

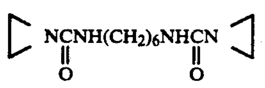 1.5 g/l Film hardener (H)

The coating was dried under the parallel stream conditions of a drying air temperature of 90° C., an overall heat transfer coefficient of 25 Kcal/$m^2$·hr·°C. for 30 seconds, followed further by the heat treatment at 140° C. for 90 seconds. On the antistatic layer, gelatin was coated to 2.0 g/$m^2$, and haze test was conducted. As the film hardener of gelatin, formalin and 2,4-dichloro-6-hydroxy-S-triazine sodium were employed. The results are shown in Table 1.

HAZE TEST

By means of a turbidimeter Model T-2600 DA manufactured by Tokyo Denshoku K.K., the film support was measured and the transmittance was represented in %. The results are shown in Table 1.

TABLE 1

| Support Sample No. | Water-soluble electroconductive polymer (A) | Hydrophobic polymer (B) | Transmittance (%) |
|---|---|---|---|
| 1 (This inv.) | (1) | (1) | 95 |
| 2 (This inv.) | (1) | (4) | 95 |
| 3 (This inv.) | (1) | (6) | 95 |
| 4 (This inv.) | (6) | (2) | 90 |
| 5 (This inv.) | (9) | (13) | 95 |
| 6 (This inv.) | (22) | (14) | 90 |
| 7 (Comparative) | (1) | (a)* | 75 |

Particle size of the hydrophobic polymer (B) was 0.1μ.
Note: *Formula (a)

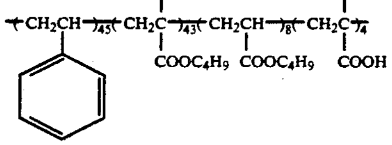

Compound disclosed in Japanese Unexamined Patent Publication No. 84658/1980, $\overline{Mn}=5{,}000$

EXAMPLE 2

Under acidic atmosphere of pH 3.0, particles containing $10^{-5}$ mole of rhodium per one mole of silver were prepared according to the control double jet method. The particles were grown in a system containing 30 mg of benzyladenine per one liter of an aqueous 1% gelatin. After mixing of silver and the halide, 600 mg of 6-methyl-4-hydroxy-1,3,3a,7-tetrazaindene was added per 1 mole of silver halide, followed by washing with water and desalting.

Subsequently, 60 mg of 6-methyl-4-hydroxy-1,3,3a,7-tetrazaindene was added per one mole of silver halide, followed by sulfur sensitization. After sulfur sensitization, 6-methyl-4-hydroxy-1,3-3a,7-tetrazaindene was added as the stabilizer.

SILVER HALIDE EMULSION LAYER

To the above respective emulsions, the following additives were added by controlling the attached amounts to those shown below, and each mixture was coated on a polyethylene terephthalate support subjected to poly(vinylidene chloride-itaconic acid) latex subbing treatment (100 μm thickness).

Latex polymer: styrene-butyl acrylate-acrylic acid ternary copolymer: 1.0 g/$m^2$
Tetraphenylphosphonium chloride: 30 mg/$m^2$
Saponin: 200 mg/$m^2$
Polyethylene glycol: 100 mg/$m^2$
Sodium dodecylbenzenesulfonate: 100 mg/$m^2$
Hydroquinone: 200 mg/$m^2$
Phenidone: 100 mg/$m^2$
Sodium styrenesulfonate-maleic acid copolymer (Mw=250,000): 200 mg/$m^2$
Butyl gallate: 500 mg/$m^2$

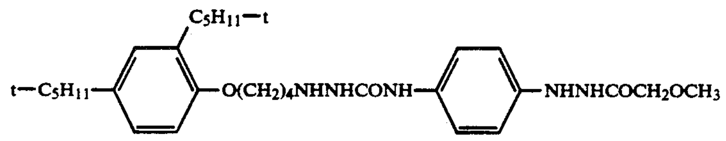

30 mg/$m^2$

5-Methylbenzotriazole: 30 mg/$m^2$
2-Mercaptobenzimidazole-5-sulfonic acid: 30 mg/$m^2$
Inert osscein gelatin (isoelectric point 4.9): 1.5 mg/$m^2$
1-(p-acetylamidophenyl)-5-mercaptotetrazole: 30 mg/$m^2$
Silver quantity: 2.8 g/$m^2$

EMULSION LAYER PROTECTIVE FILM

As the emulsion layer protective layer, the composition was prepared to the attached amounts shown below.

Fluorinated dioctylsulfosuccinic acid ester: 300 mg/$m^2$
Matte agent: polymethyl methacrylate (average particle size 3.5 μm): 100 mg/$m^2$
Lithium nitrate: 30 mg/$m^2$
Acid-treated gelatin (isoelectric point 7.0): 1.2 g/$m^2$
Colloidal silica: 50 mg/$m^2$
Sodium styrenesulfonale-maleic acid copolymer: 100 mg/$m^2$ Mordant: 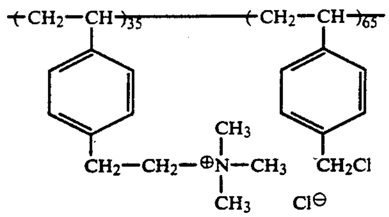 400 mg/$m^2$ Dye: 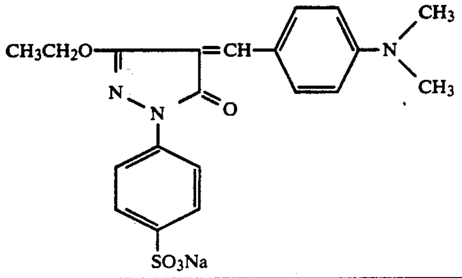 200 mg/$m^2$

BACKING LAYER

On the support on the opposite side to the emulsion layer, after previous corona discharging with a power of 30 W/$m^2$·min., a poly(vinylydene chloride-itaconic acid) latex copolymer was coated in the presence of hexamethyleneaziridine film hardener, and further the antistatic layer of the present invention with the composition shown in Table 2 was provided by coating thereon in the same manner as in Example 1. Subsequently, a backing layer containing a backing dye having the composition shown below was coated on the layer. The gelatin layer was hardened with glyoxal and 1-oxy-3,5-dichloro-S-triazine sodium salt.

Hydroquinone: 100 mg/$m^2$
Phenidone: 30 mg/$m^2$
Latex polymer: butyl acrylate-styrene copolyme: 0.5 g/$m^2$
Styrene-maleic acid copolymer: 100 mg/$m^2$
Citric acid: 40 mg/$m^2$
Benzotriazole: 100 mg/$m^2$
Sodium styrenesulfonate-maleic acid copolymer: 200 mg/$m^2$
Lithium nitrate: 30 mg/$m^2$
Backing dye (a), (b) and (c): (the employed amounts are shown below)
osccein gelatin: 2.0 g/$m^2$ Backing dye (a) 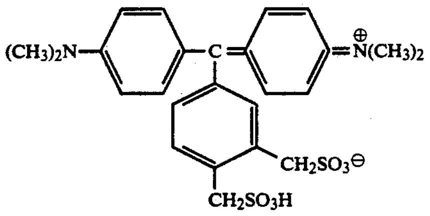 40 mg/$m^2$ Backing dye (b) 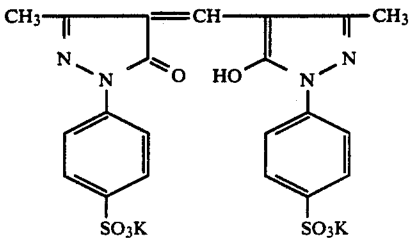 30 mg/$m^2$ -continued

| | | |
|---|---|---|
| Backing dye (c) | 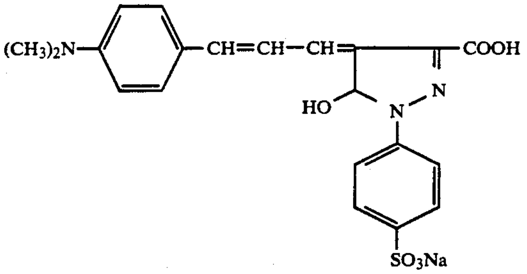 | 30 mg/m[2] |

The sample obtained as described above were subjected to whole surface exposure, and developed by use of the developing solution and the fixing solution shown below, followed by film-attached haze test.

Developing solution recipe

Hydroquinone: 25 g
1-Phenyl-4,4-dimethyl-3-pyrazolidone: 0.4 g
Sodium bromide, 3 g
5-Methylbenzotriazole. 0.3 g
5-Nitroindazole: 0.05 g
Diethylaminopropane-1,2-diol: 10 g
Potassium sulfite: 90 g
Sodium 5-sulfosalicylate. 75 g
Sodium ethylenediaminetetraacetate: 2 g
(made up to one liter with water, pH was adjusted to 11.5 with caustic soda)

Fixing solution recipe

Composition A

Ammonium thiosulfate (72.5 wt.% aqueous solution: 240 ml
Sodium sulfite: 17 g
Sodium acetate.trihydrate: 6.5 g
Boric acid: 6 g
Sodium citrate.dihydrate: 2 g
Acetic acid (90 wt.% aqueous solution): 13.6 ml Composition B Pure water (deionized water): 17 ml
Sulfuric acid (50 wt.% aqueous solution): 3.0 g
Aluminum sulfate (aqueous solution containing 8.1 wt.% content calculated on $Al_2O_3$: 20 g During use of the fixing solution, the above composition A and the composition B were dissolved in 500 ml of water in this order, and made up to one liter before use. The fixing solution had a pH of about 5.6.

Developing processing conditions

| (Step) | (Temperature) | (Time) |
|---|---|---|
| Developing | 40° C. | 8 sec. |
| Fixing | 35° C. | 8 sec. |
| Water washing | Normal temperature | 10 sec. |

Evaluation was performed as described below, and the results are shown in Table 2.

Haze test

The film supports were measured by means of a turbidimeter MODEL T-2600DA manufactured by Tokyo Denshoku K.K., and the transmittances are shown in percent.

TABLE 2

| Support Sample No. | Water-soluble electroconductive polymer (A) | Hydrophobic polymer (B) | Transmittance | Specific surface resistance |
|---|---|---|---|---|
| 8 (Inv.) | (1) | (4) | 90 | $5 \times 10^{10}$ |
| 9 (Inv.) | (1) | (6) | 93 | $5 \times 10^{10}$ |
| 10 (Inv.) | (22) | (14) | 90 | $5 \times 10^{10}$ |
| 11 (Comp.) | (1) | (a) | 70 | $6 \times 10^{10}$ |

Particle size of the hydrophobic polymer (B) was 0.1μ.

Also, when the hydrazine compound in the emulsion layer was replaced with the tetrazolium salt shown below, there was also the same effect.

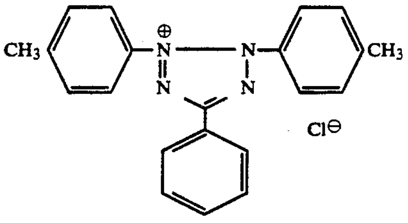

EXAMPLE 3

By use of the same recipe as in Example 1, drying was conducted by vertical stream of drying air under the conditions of an air temperature of 90° C., an overall heat transfer coefficient of 50 Kg/m$^2$·hr·°C. for 20 seconds, followed further by heat treatment for 90 seconds. Then, the same backing working as in Example 1 was performed, and the product evaluated similarly. The results are shown in Table 3.

TABLE 3

| Support Sample No. | Water-soluble electroconductive polymer (A) | Hydrophobic polymer (B) | Transmittance (%) |
|---|---|---|---|
| 12 (This inv.) | (1) | (1) | 90 |
| 13 (This inv.) | (6) | (4) | 90 |
| 14 (This inv.) | (22) | (14) | 93 |
| 15 (Comparative) | (1) | (a) | 60 |

Particle size of the hydrophobic polymer (H}was 0.1μ.

From the results in Tables 1 to 3, it can be appreciated that the samples of the present invention are excellent in transmittance.

According to the present invention, an antistatic layer for plastic film excellent in transparency without haze even when quickly dried and a light-sensitive silver halide photographic material excellent in antistatic performance could be obtained.

We claim:

1. A plastic film comprising a transparent support having an antistatic layer provided thereon, said antistatic layer consisting essentially of (1) a reaction product of a water-soluble electroconductive polymer having at least one electroconductive group selected from the group consisting of sulfonic acid, sulfuric acid esters, quaternary ammonium salts, tertiary ammonium salts, and a carboxyl group in an amount of at least 5 percent by weight per molecule of said water soluble electroconductive polymer, (2) hydrophobic polymer particles and (3) a curing agent, said hydrophobic polymer being copolymerized with a polyalkylene oxide chain represented by Formula (M);

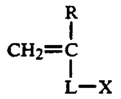 (M)

wherein R represents a hydrogen atom, a halogen atom, a lower alkyl group having 1 to 4 carbon atoms or $-CH_2-L-X-$; L represents a group having -COO- or

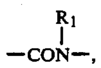

or an optionally substituted aryl group having 6 to 12 carbon atoms; $R^1$ represents hydrogen atom, an optionally substituted aryl group or a lower alkyl group having 1 to 4 carbon atoms; X represents $-(R_2-O)_n-R_3$; $R_2$ comprising at least one selected from $-CH_2CH_2-$,

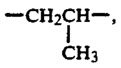

$-CH_2CH_2CH_2-$,

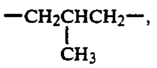

$-CH_2CH_2CH_2CH_2-$ and

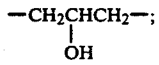

$R_3$ represents hydrogen atom or a lower alkyl group having 1 to 4 carbon atoms, and n is an integer of not less than 2 and not more than 70.

2. The plastic film according to claim 2, wherein the water-soluble electroconductive polymer has a molecular weight of 3,000 to 100,000.

3. The plastic film according to claim 2, wherein the water-soluble electroconductive polymer has a molecular weight of 3,500 to 50,000.

4. The plastic film according to claim 3, wherein the water-soluble electroconductive polymer is contained in the antistatic layer in an amount of 0.01 g to 10 $g/m^2$.

5. The plastic film according to claim 4, wherein the water-soluble electroconductive polymer is contained in the antistatic layer in an amount of 0.1 g to 5 $g/m^2$.

6. The plastic film according to claim 1, wherein the hydrophobic polymer is a polymer obtained from at least one monomer selected from the group consisting of styrene, styrene derivatives, alkyl acrylates, alkyl methacrylates, olefin derivatives, halogenated ethylene derivatives, acrylamide derivatives, methacrylamide derivatives, vinyl ester derivatives and acrylonitrile.

7. The plastic film according to claim 6, wherein the hydrophobic polymer is a polymer containing styrene derivatives, alkyl acrylates and alkyl methacrylates in an amount of at least 30 mole %.

8. The plastic film according to claim 1, wherein the polyalkylene oxide chain is introduced into the hydrophobic polymer by copolymerization of the hydrophobic polymer with a monomer having the polyalkylene oxide chain.

9. The plastic film according to claim 1, wherein the curing agent is a polyfunctional aziridine.

10. The plastic film according to claim 1, wherein the curing agent is a difunctional or trifunctional aziridine having a molecular weight of 600 or less.

* * * * *